United States Patent [19]

Borg et al.

[11] Patent Number: 4,514,764
[45] Date of Patent: Apr. 30, 1985

[54] VIDEO MONITOR WITH AUTOMATIC SWITCHING BETWEEN RF AND BASEBAND VIDEO SIGNALS

[75] Inventors: Arthur N. Borg, Lake Forest; William J. Mark, Glenview, both of Ill.

[73] Assignee: Zenith Electronics Corporation, Glenview, Ill.

[21] Appl. No.: 472,552

[22] Filed: Mar. 7, 1983

[51] Int. Cl.³ ............................................. H04N 5/46
[52] U.S. Cl. ..................................... 358/181; 358/903
[58] Field of Search ................. 358/181, 903, 86, 160, 358/335, 93, 106, 107; 455/133, 136, 140, 143; 328/104, 116, 154, 137, 152; 340/700, 706

[56] References Cited

U.S. PATENT DOCUMENTS 3,869,564 3/1975 Colodny ................................ 358/86
4,148,070 4/1979 Taylor ................................. 358/903

Primary Examiner—Tommy P. Chin

[57] ABSTRACT

A video monitor having a common input terminal is selectively operable, automatically, from RF input signals or baseband video input signals. A high pass filter is provided at the input of an RF channel which includes RF amplifying means, detecting means and a video output. A low frequency coupling capacitor is provided at the input of a baseband video channel which also includes a video output. A video amplifier having a sync tip clamping circuit is AC coupled to both said channels. A peak detector and a transistor switch are coupled to the common input terminal for disabling the RF channel responsive to the input of a baseband video signal to minimize noise.

6 Claims, 1 Drawing Figure

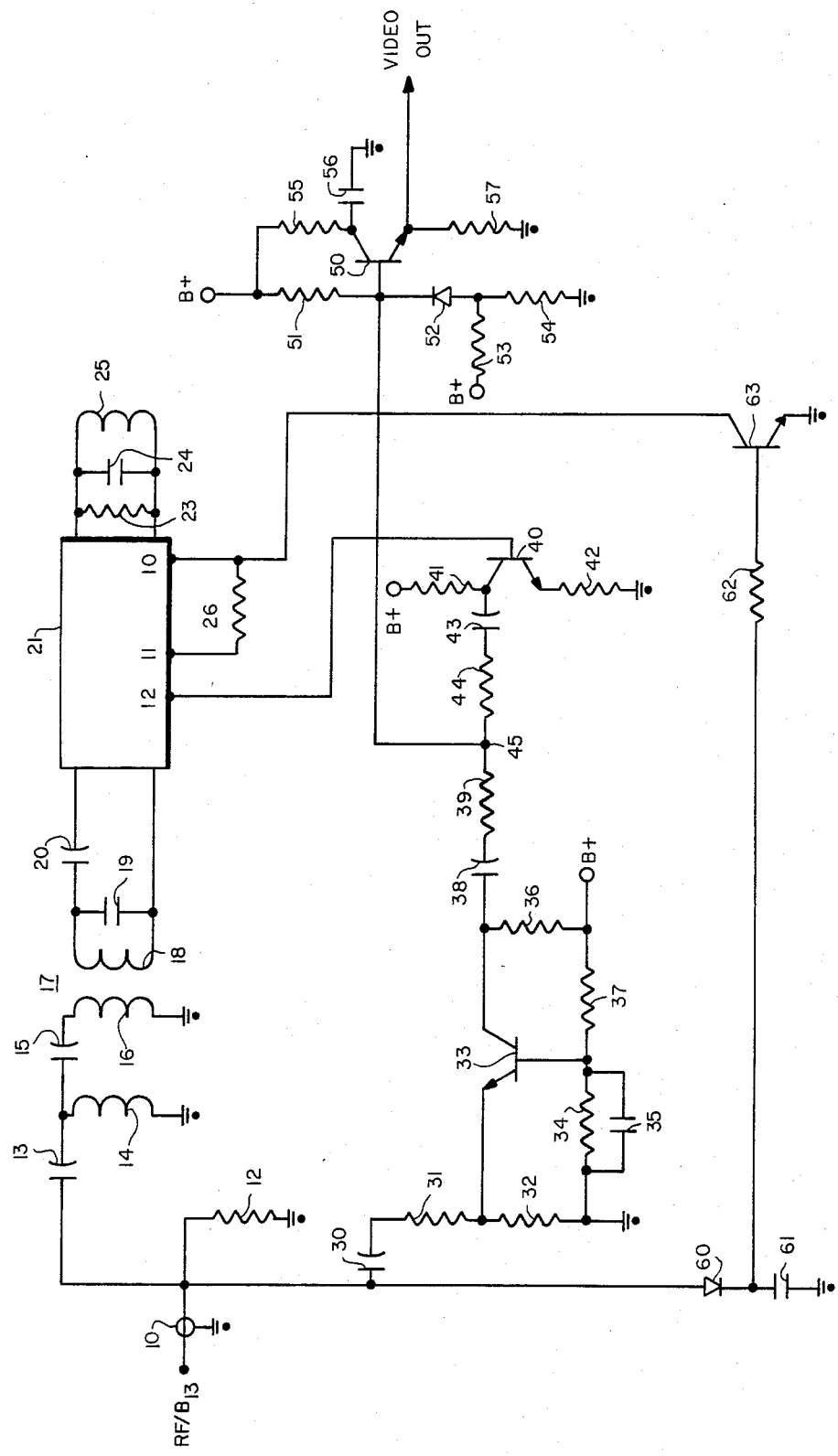

VIDEO MONITOR WITH AUTOMATIC SWITCHING BETWEEN RF AND BASEBAND VIDEO SIGNALS

BACKGROUND OF THE INVENTION AND PRIOR ART

This invention is directed to video monitors useful with relatively inexpensive computer systems.

The development of the low cost microprocessor created the portable, inexpensive computer market which is bringing the benefits of computer technology to a large body of non-technically educated people. The equipment may be used with existing television receivers or with separate, generally dedicated, video monitors. A video monitor is essentially a television receiver without the capability of receiving broadcast radio frequency signals. The available portable computers either have a direct video output for suplying video signals at baseband frequency to the video input of a monitor, or a radio frequency (RF) output for supplying modulated signals at VHF frequency for connection to the VHF television antenna terminals of a television receiver through an appropriate switch. Commonly, frequencies corresponding to VHF channels 3 and 4 are used.

There has been an equally rapid expansion of the video monitor market. Yet, most monitors, with their baseband video input circuitry, aren't compatible with computer equipment having RF outputs. Presently the owner of such computer equipment must seek a monitor (or television receiver) having an input that will accept the output of his computer. As the required level of technical sophistication of computer users diminishes the need for a universal monitor to function with either type of computer output increases. Thus it would be of benefit to the art to have video monitors available with a common input connection capable of selective operation, automatically, with computer devices producing basband video signals or video signals modulated on VHF channel 3 or 4 frequencies.

OBJECTS OF THE INVENTION

Accordingly, the principal object of the invention is to provide an improved video monitor.

Another object of the invention is to provide a video monitor capable of operation with either baseband video input signals or RF modulated video input signals.

SUMMARY OF THE INVENTION

In accordance with the invention, a video monitor includes a common input terminal coupled to a first channel including RF amplification means, detection means and video amplification means and to a second channel including baseband video amplification means. The monitor further includes common video translation means coupled to the outputs of both channels.

A feature of the invention resides in the provision of an automatic disabling circuit for disabling the first channel in response to a baseband video input signal at the common terminal.

BRIEF DESCRIPTION OF THE DRAWING

Further objects and advantages of the invention will be apparent from reading the following description in conjunction with the drawing, the single FIGURE of which represents a schematic diagram of a portion of a video monitor constructed in accordance with the invention.

DESCRIPTION OF THE PREFERRED EMBODIMENT

Referring to the drawing, a common input terminal 10 is provided for connection to either a source of RF signals or to a source of baseband video signals. Common input terminal 10, which may comprise a well known type of phono input jack suitable for connection to shielded type coaxial cable, connected through a resistor 12 to ground. It also supplies a first channel including a series-connected capacitor 13 and inductor 14. The other terminal of inductor 14 is connected to ground and the values of capacitor 13 and inductor 14 are selected to form a high pass filter for essentially blocking baseband video signals. The junction of capacitor 13 and inductor 14 is connected to a capacitor 15 in series with the primary winding 16 of an RF transformer 17. Transformer 17 has a secondary winding 18 which is tuned by a capacitor 19 coupled thereacross. Tuning of the transformer is midway between VHF channels 3 and 4 which enables response to signals at both these frequencies. The transformer output is supplied through a DC blocking capacitor 20 to a differential input IC circuit 21 for amplifying and detecting the RF input signals. The detector circuit (not shown) within IC 21 includes a parallel circuit arrangement of a resistor 23, a capacitor 24 and an inductor 25 which, while being physically located outside of the integrated circuit, cooperates in a conventional manner for detecting video modulation of the RF signal. The integrated circuit is available under Zenith Radio Corporation part number 221-159 and is commercially available from Signetics a subsidiary of U.S. Philips Corporation under the designation TBA 1441. The numbers 10, 11 and 12 on IC 21 correspond to actual connection pins of the IC. Pins 10 and 11 are interconnected by a resistor 26. A negative video output singl (at baseband frequency) is available at pin 11 and a similar, but positive, video output signal is available at pin 12. Pin 10 is referred to as the black level set input and is connected to the automatic gain control (AGC) circuit (not shown) in the IC. Therefore, the gain characteristic of the RF amplifier in the IC is determinable by the DC voltage applied to pin 10.

The positive video signal at pin 12 is supplied to the base of a video amplifier transistor 40. A source of B+ voltage connects a load resistor 41 to the collector of transistor 40, which constitutes the output of the first channel. The emitter of transistor 40 is connected through a resistor 42 to ground. The output signal at the collector of transistor 40 is AC coupled via a capacitor 43 and a resistor 44 to a terminal 45.

Common input terminal 10 also supplies a second channel through a low frequency coupling capacitor 30 connected in series with a pair of resistors 31 and 32 which are connected to ground. The second channel accepts video input signals at baseband frequency. Capacitor 30 assures that the 60 Hz vertical synchronizing signals in the video input signal are not lost. This channel includes a common base transistor amplifier 33 having a signal gain of about 3. A source of B+ voltage is connected through a load resistor 36 to the collector of transistor 33. The emitter of the transistor is connected to the junction of resistors 31 and 32. A resistive bias string, consisting of a pair of resistors 37 and 34, is connected from B+ to ground, with the resistor junction being connected to the base of transistor 33. A capacitor 35 is connected across resistor 34 for signal decoupling. The collector of the common base amplifier is the output of the second channel. The signal output is AC coupled through a capacitor 38 and a resistor 39 to terminal 45. It will thus be seen that video signals from the first channel (RF channel) and from the second channel (baseband channel) are both AC coupled to terminal 45. It will be appreciated that only one source of signal is connectable to common input terminal 10 at any given time and that therefore, except for noise, simultaneous signals from both channels are not present at terminal 45.

The video signal at terminal 45 is connected to the base of a video amplifier transistor 50. A source of B+ voltage is connected, through a resistor 51, to the base of transistor 50 and, through a resistor 55, to its collector. A capacitor 56, connected from the collector of the transistor to ground, decouples signals thereon. The emitter of transistor 50 is connected through a resistor 57 to ground to provide a video output signal for further processing in the video monitor. A diode 52, connected to the base of transistor 50, has its anode supplied from the junction of a pair of resistors 53 and 54 connected between B+ voltage and ground. Consequently, the cathode of diode 52 is maintained at a positive potential. The combination of the diode and the bias voltage at its cathode provides clamping of sync tip levels on video signals supplied to the video signal translation means comprising transistor 50.

A switching arrangement is provided for automatically disabling the RF channel when baseband video signals are coupled to the common input terminal. A peak detector comprises a diode 60 and a capacitor 61 connected in series between common input terminal 10 and ground. The junction of diode 60 and capacitor 61 is connected, through a resistor 62, to the base of a switching transistor 63, which has its collector connected to pin 10 of IC 21 and its emitter connected to ground. The presence of a baseband video signal of appropriate amplitude at input terminal 10 will produce a sufficiently positive potential across capacitor 61 to drive transistor 63 conductive and thereby ground pin 10. Grounding pin 10 of IC 21 results in its AGC circuit disabling the IC output. Thus, in the presence of baseband video signals, the RF channel is disabled. Noise that would be generated in the RF channel, (which would be operating at high gain because of the no RF-signal condition) is therefore prevented from appearing at terminal 45.

Since the common input terminal is supplied from a 75 ohm shielded cable resistor 12 is selected to have a value of 120 ohms and capacitor 13 a value of 30 picofarad. Capacitor 30, on the the other hand has a value of about 100 microfarad. Resistor 12 is common to both the RF and the baseband channel input circuits and each input circuit presents an impedance of about 75 ohms to common input terminal 10. The RF channel requires a substantial amount of gain because most portable computers have an RF output below 3000 microvolts to assure compliance with FCC signal radiation regulations. The baseband video input signal will measure about one volt peak-to-peak, which in conjunction with a diode voltage drop of about 0.3 volt, will be sufficient to drive transistor 63 into conduction and disable the RF amplifier. The loading of the peak detector on the input circuit should be kept as low as possible.

What has been described is a novel video monitor in which the user need not be concerned whether the output from his computer apparatus is at RF or baseband video frequency. The video monitor includes a single common input terminal and automatically operates in accordance with the connected input signal. It will be recognized that numerous modifications and changes in the described embodiment of the invention will be apparent to those skilled in the art without departing from the true spirit and scope thereof. The invention is to be limited only as defined in the claims.

I claim:

1. A video monitor selectively operable with RF input signals and baseband video signals comprising:
   a common input terminal;
   a first channel including RF amplification means, detection means and video amplification means coupled to said common input terminal;
   a second channel including baseband video amplification means coupled to said common input terminal;
   common video signal translation means coupled to the outputs of both said channels to provide selected video output signals; and
   means for disabling said first channel responsive to the input of a baseband video signal at said common input terminal.

2. A video monitor as set forth in claim 1 wherein said disabling means includes a peak detector coupled to said common input terminal and a transistor switch for reducing the gain of said first channel.

3. A video monitor as set forth in claim 2 wherein said video signal translation means includes clamping means for clamping the sync tips of video signals supplied thereto and wherein both said first channel and said second channel are AC coupled to said video translation means.

4. A video monitor as set forth in claim 3 wherein said first channel includes a high pass filter in its input and said second channel includes a low frequency coupling capacitor in its input.

5. A video monitor selectively operable, automatically, from baseband video input signals and RF input signals comprising:
   a common input terminal adapted for connection to sources of either of said input signals;
   an RF channel coupled to said common input terminal, said RF channel including a high pass filter, RF amplifying means, detection means, and a video amplifier having a first output terminal,
   a baseband video channel including a low frequency coupling capacitor connected to said common input terminal and a video amplifier having a second output terminal;
   video signal translation means having an input circuit AC coupled to both said first and said second output terminals and including clamping means for determining the level of the sync tips of video signals supplied to its input circuit; and
   means coupled to said common input terminal and responsive to baseband signals thereat for disabling said RF channel to preclude coupling noise to said video signal translation means to provide selected video output signals.

6. A video monitor as set forth in claim 5 wherein said disabling means include peak detection means for producing an output in response to baseband video input signals of a given magnitude, and
   a transistor switch for disabling said RF channel responsive to said peak detector means.

* * * * *